United States Patent [19]
Weisser

[11] 3,902,355
[45] Sept. 2, 1975

[54] APPARATUS FOR THE ELECTRONIC-DIGITAL MEASUREMENT OF GAS PRESSURE

[75] Inventor: Werner Weisser, Herrsching, Germany

[73] Assignee: Apparatebau Gauting GmbH, Gauting, Germany

[22] Filed: July 17, 1973

[21] Appl. No.: 380,119

[30] Foreign Application Priority Data
July 31, 1972  Germany.............................. 2237596

[52] U.S. Cl................................. 73/384; 73/398 R
[51] Int. Cl............................................... G01L 7/00
[58] Field of Search............. 73/398 R, 398 C, 67.2, 73/53, 32 A, 384, 182

[56] References Cited
UNITED STATES PATENTS
3,257,850   6/1966   Koolman.......................... 73/398 R

*Primary Examiner*—Donald O. Wood
*Attorney, Agent, or Firm*—Waters, Schwartz & Nissen

[57] ABSTRACT

Apparatus for measuring gas pressure to determine altitude or speed. A tuning fork is damped by the gas and its frequency is evaluated according to a hyperbolic curve consisting of two merging parts. The tuning fork is provided with rebound members to control the damping effect of the gas. Pickup is effected by electromagnetic windings or by acoustic or optical sensors. The rebound members can be sheathed by a jacket. The tuning fork can be temperature compensated. An evaluating circuit can be employed which includes a distorting portion in which a ratio-multiplier is associated with a forward-and-backward counter. The pulse input to the ratio-multiplier depends on the frequency of the tuning fork and the pulse output of the ratio-multiplier is coupled to the backward counting input of the counter, the forward counting input of which is supplied with pulses at a constant frequency. The counter has a plurality of parallel outputs.

7 Claims, 10 Drawing Figures

PATENTED SEP 2 1975

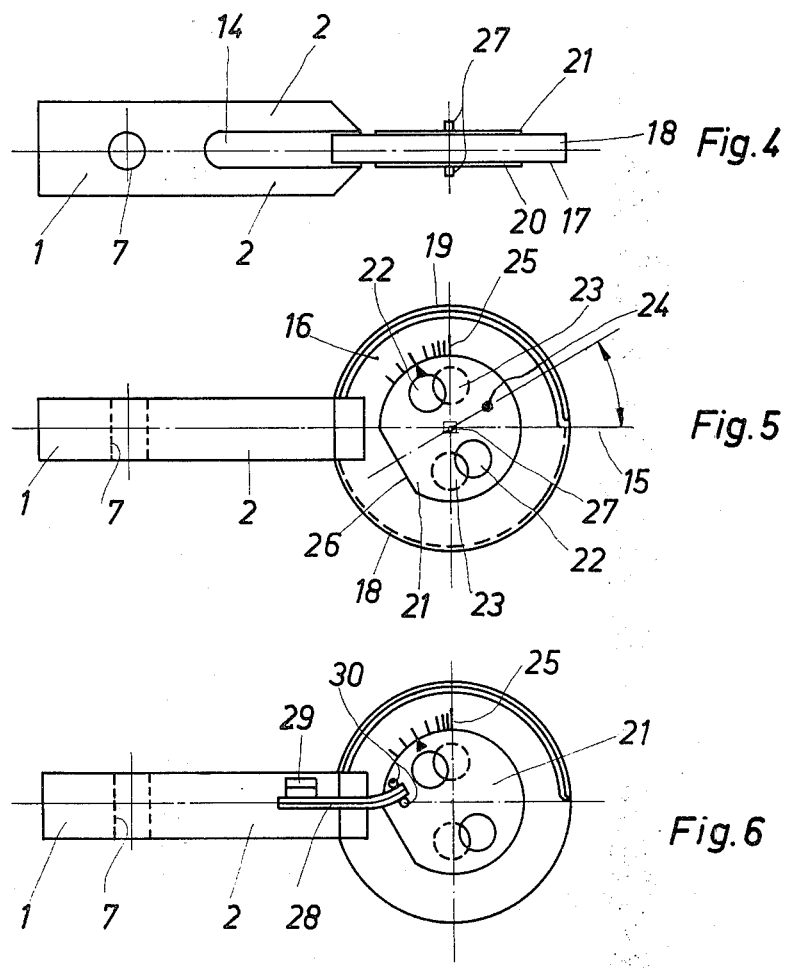

APPARATUS FOR THE ELECTRONIC-DIGITAL MEASUREMENT OF GAS PRESSURE

FIELD OF THE INVENTION

This invention relates to apparatus for the measurement of gas pressure and, more particularly, for the measurement of air pressure. The invention furthermore relates to apparatus which can preferably be used for measuring altitude on board aircraft.

BACKGROUND

The altitude of flight is as a rule indirectly determined on board aircraft by measuring air pressure. Traditional altimeters, working in accordance with this process, determine air pressure by means of an aneroid barometer. The mechanical deflection of a diaphragm of the aneroid barometer is mechanically picked up, transmitted and caused to give an indication. This has the disadvantage that the range of measurement and accuracy are limited by the need to overcome return forces and frictional forces in the mechanical transmission. The upper limit of measurement of an aneroid barometer altimeter is about 16,000 m. with a direct mechanical indication. Relatively expensive servo circuits are necessary in order to increase the range.

SUMMARY OF THE INVENTION

It is an object of the invention to provide an apparatus for measuring gas pressure which works considerably more accurately than those heretofore available, and which also can evaluate relatively low gas pressures such as, for example, those which prevail at great altitudes.

According to the invention, there is provided an oscillator comprising a mechanical oscillating element whereof the frequency of oscillation is affected, by the pressure of the gas surrounding this oscillating element, by a frequency-measuring circuit which measures the frequency of oscillation of the oscillator, and by an evaluating circuit which converts the measured frequency of oscillation into a value corresponding to the gas pressure.

The value corresponding to the gas pressure is a measure of the altitude of flight if the arrangement is used as an altimeter in an aircraft. In the case of the arrangement according to the invention, the value mentioned is worked out electrically and not mechanically, with the result that the accuracy of measurement is considerably increased.

According to a further development of the invention, the oscillating element may be a tuning fork. In order to make the frequency at which the tuning fork oscillates more dependent on the gas pressure surrounding it, the oscillating arms of the tuning fork can be provided with rebound members which increase the damping of the tuning fork by the gas.

The frequency at which the tuning fork oscillates may be made still more dependent on the gas pressure by the use of a non-oscillating core between the rebound members and at a distance therefrom. This imparts the greatest possible value to the ratio between the maximum and minimum volumes of gas between the rebound members and the core. Thus, in turn, the damping exerted by the gas on the oscillations and the dependence of their frequency on the gas pressure become especially great. This effect may be further reinforced by sheathing the rebound members with a jacket arranged at a distance from them.

Another feature resides in that the core and/or jacket is displaceable in the longitudinal direction of the oscillating arms. This enables the damping and accordingly also the frequency of oscillation of the tuning fork to be affected.

In accordance with one embodiment, the rebound members may be made in the form of flat and substantially parallel plates with angled mutually overlapping edges directed towards one another. It is, however, also possible, for example, to make the rebound members in the form of flat and substantially parallel plates, each plate comprising an angled edge directed towards the other plate defined by the longitudinal direction of the oscillating arms. In this connection, the edges of the two plates are advantageously so arranged as to be symmetrically disposed with respect to the longitudinal direction of the oscillating arms.

In order to insure that both oscillating arms oscillate at the same frequency, it is arranged that the centers of gravity of the two plates be at the same distance from a reference point disposed on the junction line between the plane of symmetry and the plane of oscillation of the tuning fork.

In order to reduce the damping and thus the frequency of oscillation of the tuning fork, each of the two plates may be more or less closed. In order to insure that the centers of gravity of the two plates coincide as mentioned, each of the two plates may, for example, be provided with gas-passage apertures of equal size and at the same distance from the plane of symmetry of the tuning fork.

Another feature of this embodiment may reside in that each of the two plates is provided with a rotary shutter capable of being rotated about an axis extending in the plane of symmetry of the tuning fork and perpendicularly to the plane of oscillation, and in that each of the two rotary shutters is provided with two holes which coincide in a definite position of rotation with the corresponding gas-passage apertures in the relevant plate.

The center of gravity of the rotary shutters may be disposed on the rotational axis. However, should it also be desired to affect the characteristic resonance of the tuning fork as well as the damping, it is also possible to arrange the center of gravity of the rotary shutters away from the rotational axis. In this case, however, the center of gravity of the two rotary shutters should be superposed. It is especially appropriate to provide for the possibility of rotating the two rotary shutters in synchronism with one another, so that the center of gravity is displaced in the same manner.

In order to compensate for any undesired dependence of the tuning fork frequency on the surrounding temperature, it is furthermore proposed that a bi-metal strip be fastened to each of the two arms of the tuning fork and linked to the corresponding rotary shutter, so that it rotates the rotary shutter in order to change the frequency of oscillation and damping of the tuning fork in dependence on the surrounding temperature.

A possible method of compensating for the dependence of the tuning fork frequency on the surrounding temperature resides in that the tuning fork is provided with a temperature-measuring sensor delivering an electrical signal which corresponds to the surrounding temperature and which is fed to a variable-frequency auxiliary oscillator, the frequency of the output signal of the auxiliary oscillator varying in accordance with the signal fed to it. The output signal of the auxiliary oscillator is mixed with the output signal of the tuning fork oscillator in a mixer. The temperature characteristic of the temperature-measuring sensor opposes the temperature characteristic of the tuning fork oscillator in such a manner that the frequency of the output signal of the mixer is constant.

A coil is expediently coupled to the oscillating arms of the tuning fork for electromagnetic excitation purposes. The tuning fork frequency may likewise be picked up electromagnetically. However, this has the disadvantage that undesired magnetic coupling occurs between the exciter coil and the take-off coil. It can therefore be arranged, in order to avoid this disadvantage, that the tuning fork frequency be picked up by means of an acoustic or optical sensor.

As already mentioned, it is possible to measure the altitude of an aircraft with the apparatus of the invention. On the other hand, however, the horizontal speed of a vehicle can also be measured with the arrangement. In order to attain this result, oscillating element can be located in a space linked to a ram pipe disposed on a vehicle, so that the pressure of the gas surrounding the oscillating element is determined by the ram pressure, which in turn depends on the speed of the vehicle.

Since there is a non-linear relationship between altitude and air pressure, the evaluating circuit must comprise a distorting portion to which is fed an input signal whereof the frequency depends on the frequency of the pressure-dependent oscillator. The values of the distorting portion of the circuit are made such that it has a transmission characteristic curve approximating the function by which altitude depends on air pressure, so that the output signal of the distorting portion of the circuit is a direct measure of altitude. The function mentioned, by which altitude depends on air pressure, is of a hyperbolic character. One arrangement for realizing a hyperbolic transmission characteristic curve may reside in that the distorting portion of the circuit comprises a first ratio-multiplier, called VV, and forward-and-backward counter, called VRZ. The pulse input of the first ratio-multiplier VV is fed with pulses whereof the frequency depends on the frequency of the pressure-dependent oscillator. The pulse output of the first ratio-multiplier VV is coupled to a backward-counting input of the first forward-and-backward counter VRZ. A forward-counting input of the first forward-and-backward counter VRZ is fed with pulses at a constant frequency. The parallel outputs of the first forward-and-backward counter VRZ are linked to the corresponding parallel control inputs of the first ratio-multiplier VV, the output signal which is a direct measure of the altitude, being capable of being taken off in the form of parallel items of binary information at the parallel outputs of the first forward-and-backward counter VRZ. The combination described of a ratio-multiplier VV and a forward-and-backward counter VRZ works in the present case as a frequency-ratio detector. In order that the function with which altitude depends on air pressure may be attained with the closest possible approximation with the transmission characteristic curve capable of being achieved with the frequency-ratio detector, the transmission characteristic curve may be subdivided into at least two parts which are, more precisely parts of a hyperbola, each coinciding as far as possible with the corresponding part of the real function. This may be done if the modification of the input quantities of the frequency-ratio detector is switched over to another value when the pulses being fed to the pulse input of the first ratio-multiplier VV are at a definite frequency. The modification values determine the displacements and curvatures of the pieces of the hyperbola in the co-ordinate system so that the desired approximation is to a large extent attained.

The parallel outputs of the first forward-and-backward counter VRZ may be linked to a digit-indicating device and/or to a date-processing instrument which evaluates the altitude information or passes it on via communication paths. Because the altitude information is worked out here in the form of an electrical-and-digital value, the arrangement according to the invention is especially suitable for automatic reporting back of altitude, which even now is a flight-safety regulation for a few groups of aircraft.

The frequency-ratio detector made up in the manner mentioned of a ratio-multiplier VV and a forward-and-backward counter VRZ furthermore confers the advantage that not only the altitude of an aircraft, but also the vertical speed thereof, may be worked out with it in simple fashion. This is possible because the backward-counting input of the first forward-and-backward counter VRZ is linked to the forward-counting input of a second forward-and-backward counter VRZ, because the backward-counting input of the second forward-and-backward counter VRZ is linked to the pulse output of a second ratio-multiplier VV is linked to the forward-counting input of the first forward-and-backward VRZ, because the parallel outputs of the second forward-and-backward counter VRZ are linked to the corresponding parallel control inputs of the second ratio-multiplier VV, because the parallel outputs of the second forward-and-backward counter VRZ are linked to the corresponding parallel inputs of a subtraction unit working in binary fashion, and because the parallel subtraction inputs of the subtraction unit are fed with constant binary information in parallel form, it being possible to take from the parallel outputs of the subtraction unit an output signal which is a direct measure of the vertical speed.

The parallel outputs of the subtraction unit may be linked to a digit-indicating device and/or to a data-processing instrument which evaluates the vertical-speed information or passes it on via communication paths.

In order to approach the transmission function of the distorting portion of the circuit in the above-mentioned manner by at least two parts of a hyperbola, it is furthermore arranged that the forward-counting input of the first forward-and-backward counter VRZ be linked to the pulse output of a third ratio-multiplier VV whereof the pulse input is fed with pulses at a constant frequency, that the parallel control inputs of the third ratio-multiplier VV be linked to a first change-over switch which is fed with at least two different constant items of binary information in parallel form which define the curvatures of the parts of a hyperbola which merge into one another, that the output of a first OR association member be linked to the pulse input of the first ratio-multiplier VV, that one input of the first OR association member be fed with pulses whereof the frequency depends on the frequency of the pressure-dependent oscillator, that the other input of the first OR association member be linked to the pulse output of a fourth ratio-multiplier VV whereof the pulse input is fed with pulses at a constant frequency, that the parallel control inputs of the fourth ratio-multiplier VV be linked to a second change-over switch which is fed with at least two different constant items of binary information in parallel form which determine the displacement of one part of a hyperbola in the co-ordinate direction corresponding to the gas pressure with respect to the merging point of the two parts of a hyperbola, that the pulse input of a fifth ratio-multiplier VV whereof the pulse output is linked to one input of a second OR association member linked to the pulse input of the first ratio-multiplier VV, that the second input of the OR association member be linked to the pulse output of the first ratio-multiplier VV, that the output of the second OR association member be linked to the pulse output of the first ratio-multiplier VV, that the output of the second OR association member be linked to the backward-counting input of the first forward-and-backward counter VRZ, that the parallel control inputs of the fifth ratio-multiplier VV be linked to a third change-over switch which is fed with at least two different constant items of binary information in parallel form which determine the displacement of the other part of a hyperbola in the co-ordinate corresponding to altitude with respect to the merging point of the two parts of a hyperbola, that the first, second and third change-over switches be together linked to a change-over device, that the change-over device be controlled by a frequency-discriminator, and that the frequency-discriminator be fed with pulses whereof the frequency depends on the frequency of the pressure-dependent oscillator, the turnover point of the discriminator lying at the frequency corresponding to the merging point of the parts of a hyperbola.

BRIEF DESCRIPTION OF THE DRAWING

Embodiments of the invention are described hereinafter with reference to the accompanying drawing in which:

FIG. 4 shows a third form of tuning fork in lateral elevation;

FIG. 5 is an elevational view from above of the third form of tuning fork illustrated in FIG. 4;

FIG. 6 is an elevational view from below of the third form of embodiment of the tuning fork shown in FIG. 5, this tuning fork being provided with an automatic temperature-compensating device;

DETAILED DESCRIPTION

Figure 1:
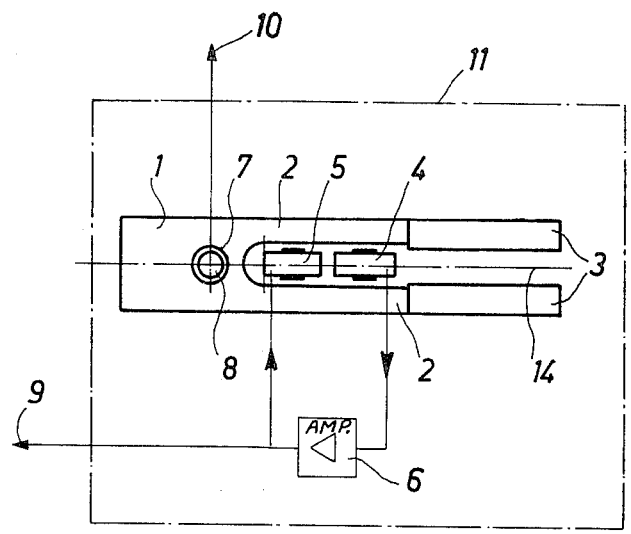
FIG. 1 is a diagrammatic illustration of a tuning fork oscillator, the tuning fork being shown in lateral elevation.

The tuning fork oscillator 11 illustrated in FIG. 1 comprises a tuning fork 1 with two oscillating arms 2 having a plane of oscillation 14. At the ends of the oscillating arms 2, there are located rebound members 3 in the form of identical half-shells. Between the oscillating arms 2, there are a sensor coil 4 and an exciter coil 5. The sensor coil 4 picks up the frequency of oscillation of the tuning fork 1 electromagnetically from the tuning fork 1 and feeds it to an amplifier 6. The amplifier 6 in turn feeds the exciter coil 5. The frequency of oscillation is picked up from the tuning fork oscillator 11 via the lead 9. The turning fork 1 is furthermore provided with a bore 7 in which there is located an electrical temperature-sensitive component 8. The component 8 delivers via a lead 10 a signal depending on the temperature of the tuning fork 1.

Figure 2:
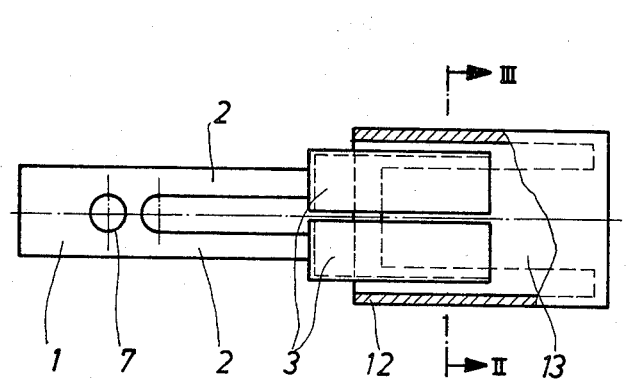
FIG. 2 is a lateral elevational view of a second form tuning fork.
Figure 3:
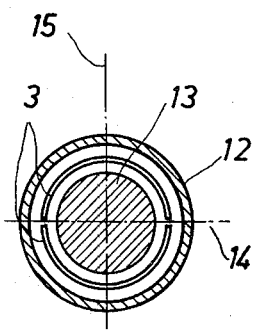
FIG. 3 is a sectional view along line III—III through the tuning fork shown in FIG. 2.

The second form of tuning fork illustrated in FIGS. 2 and 3 differs from the first form illustrated in FIG. 1 in that a core 13 spaced from the rebound plates 3 is introduced into the cavity surrounded by the rebound plates 3. The core 13 and a jacket 12 are displaceable with respect to rebound plates. The core 13 and the jacket 12 make the ratio between the maximum volume and the minimum volume of the air having a damping action on the rebound plates especially large. The damping affects the frequency of the tuning fork 1. Because the core 13 and the jacket 12 can be displaced with respect to the rebound plates 3, it is also possible to vary the frequency of oscillation of the tuning fork as may be desired.

In the case of the third form of tuning fork shown in FIGS. 4 and 5, the rebound members consist of two circular plates 16 and 17. Each of the two plates 16 and 17 is surrounded by a semicircular edge 18 or 19 angled towards the other plate. The two edges 18 and 19 are oppositely arranged with reference to the plane of symmetry 15 of the tuning fork 1.

Each of the two plates 16 and 17 is provided with two passage apertures 23 for the air in between. The two passage apertures 23 are at the same distance from the plane of symmetry 15 of the tuning fork 1. The arrangement of the edges 18 and 19 on opposite sides of the plane of symmetry 15 and the equal distance of the passage apertures 23 from the plane of symmetry 15 insure that the centers of gravity of the two plates 16 and 17 are superposed.

Each of the two plates is provided with a rotary shutter 20 and 21. The two rotary shutters are rotatable about an axis. The two rotational axes of the rotary shutters coincide. Each of the two rotary shutters 20 and 21 is provided with two holes 22 which correspond in a certain rotational position with the passage apertures 23 in the corresponding plate 16 and 17. Each of the two rotary shutters 20 and 21 also comprises a non-round rotational pin 27. The use of a fork shaped key adapted to the non-round pins 27 enables the two rotary shutters 20 and 21 to be rotated synchronously. This synchronous rotation is appropriate when the center of gravity of the rotary shutters is so located by a cut-away 26 that it does not coincide with the rotational point. When the two shutters 20 and 21 are rotated synchronously, the center of gravity 24 of the two rotary shutters is then displaced in the same manner with respect to any reference point (not shown) lying on the intersection line between the plane of oscillation 14 and the plane of symmetry 15 of the tuning fork 1. The fundamental resonant frequency of the tuning fork may be varied by this displacement of the center of gravity 24. The above tuning forks are, of course, fixed at the end which leaves the prongs free to oscillate. These tuning forks can be fixed in any simple manner such as by soldering, screwing and so forth. One known technique is illustrated in the brochure of Alfred Neye-Enatechnik GmbH of June 1973.

One method of compensating for the effect of temperature on the frequency of oscillation of the tuning fork is shown in FIG. 6. A bi-metallic strip 28 is fastened by means of an angle piece 29 to each of the two oscillating arms 2 (only one bi-metallic strip and one angle piece are visible in FIG. 6). The bi-metallic strip 28 is linked to cams 30 disposed on the corresponding rotary shutter. The bending characteristic of the bi-metallic strip 28 is so chosen that the rotary shutter is rotated in a manner which provides compensation for the effect of temperature on the frequency of oscillation of the tuning fork 1 by displacing the center of gravity.

As may be gathered from FIGS. 5 and 6, the plates 16 and 17 may be provided with a scale 25 on which it is possible to read off the frequency of oscillation of the tuning fork 1 capable of being affected by the change in the center of gravity.

Figure 7:
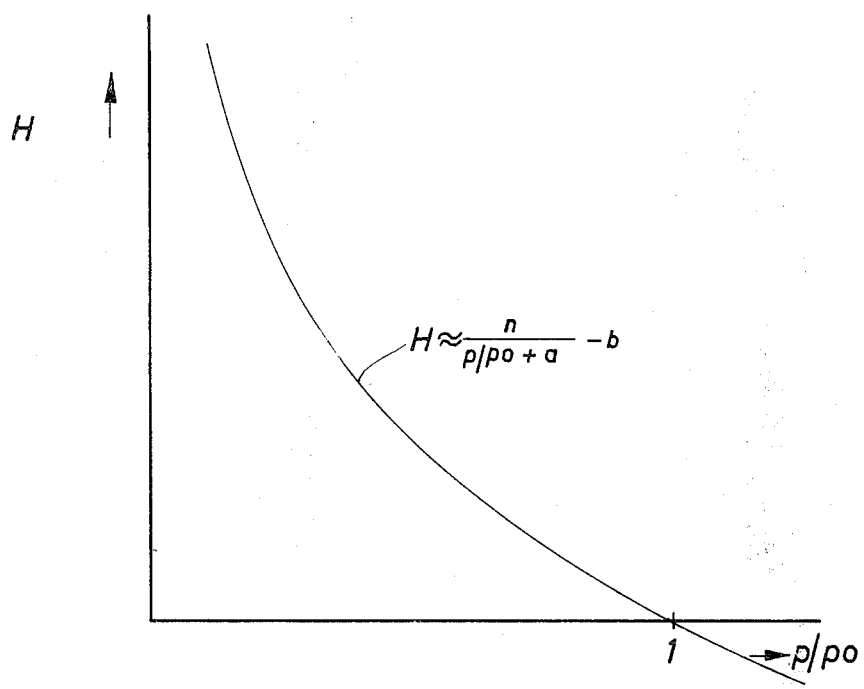
FIG. 7 is a graphical illustration of the dependence of altitude on relative air pressure.

The dependence of altitude on relative air pressure $p/p_o$ is illustrated in FIG. 7. The value of $p/p_o$ equal to 1 expresses the international standard atmosphere for flying operations. As will be perceived, the relationship between altitude H and relative air pressure $p/p_o$ is characterized by a hyperbola-like function.

Figure 8:
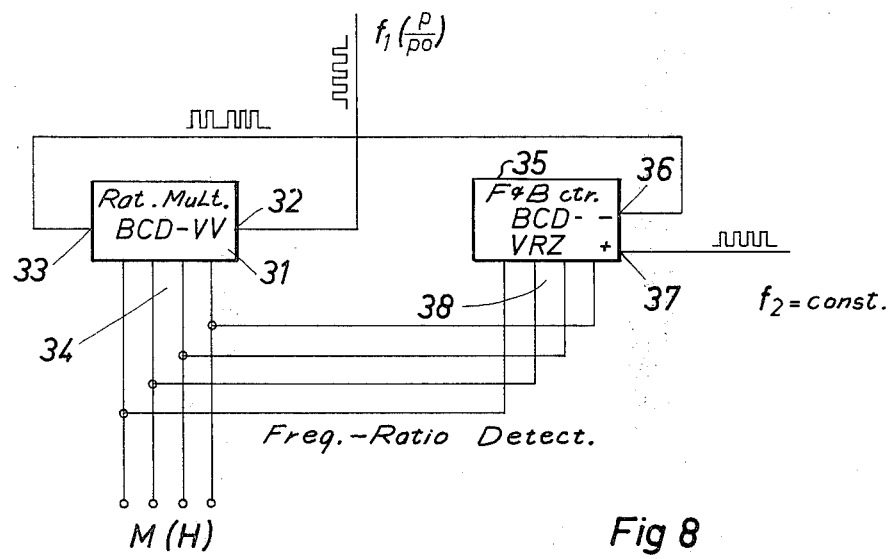
FIG. 8 is a block circuit diagram of a frequency-ratio detector used in the electrical portion of the apparatus according to the invention.

The fundamental electrical principle of the invention resides in that the measured pressure is converted into a pulse frequency and distorted by means of a frequency-ratio detector as shown in FIG. 8. The frequency-ratio detector in FIG. 8 consists of a ratio-multiplier 31, hereinafter called VV, and a forwards and backwards counter 35, hereinafter called VRZ. The two components 31 and 35 work in binary fashion. However, in order that the values worked out may be indicated decimally, they are coded in binary decimal fashion (BCD).

The pulse input 32 of the VV 31 is supplied with pulses at a frequency $f_1$ depending on the relative air pressure $p/p_o$. The pulse output 33 of the VV 31 is linked to the backward-counting input 36 of the VRZ 35. The forward-counting input 37 of the VRZ 35 is supplied pulses at a constant frequency $f_2$. The parallel outputs 38 of the VRZ 35 are linked to the corresponding parallel control inputs 34 of the VV 31. The number of parallel outputs 38 of the VRZ 35 and of parallel control inputs 34 of the VV 31 (in the present case, there are four) is only given as an example in FIG. 8. In practice, this number depends on the required accuracy of measurement. A value M (H), more precisely explained later, may be picked up at the parallel outputs 38 of the VRZ 35, said value being hyperbolically distorted with respect to the relative air pressure $p/p_o$ worked out and with respect to the frequency $f_1$ and representing binary-decimal coded information as to the altitude.

The VV 31 may be a conventional digital-electronic component of the kind customarily available nowadays. The function of the VV 31 is briefly as follows:

The VV suppresses definite pulses of a continuous pulse train fed to its pulse input 32; i.e., a pulse train lacking one or more pulses from time to time appears at the pulse output 33. The number of suppressed pulses may be determined by information fed to the parallel control inputs 34 of the VV 31. If the pulses at the pulse output 33 of the VV 31 are counted in a definite time-unit, this number is less than the number of pulses at the pulse input 32 in the same time-unit. In other words, the pulse frequency at the pulse output 33 is lower than the pulse frequency at the pulse input 32. The relationship between the output frequency $f_a$ and the input frequency $f_e$ is given by the following formula in the case of a normal binary-coded VV:

$$f_a = \frac{M}{2^k} \cdot f_e \qquad (1)$$

Here $k$ is the number of parallel control inputs, and M is the information fed to the parallel control inputs in parallel binary form and determining the number of suppressed pulses. If the VV is binary-decimal-coded (designated in FIGS. 8 and 10 by BCD-VV), the relationship between $f_a$ and $f_e$ is as follows:

$$f_a = \frac{M}{10^{mges}} \cdot f_e \qquad (2)$$

Here $k$ is the number of individual decades to the base 10. A plurality of BCD-VVs may also be connected together in order corresponding to increase the counting range. In this case, regard must be had to the total number (ges) of individual decades of all the BCD-VVs.

As already mentioned, the VV 31 and the VRZ 35 co-operate as a frequency-ratio detector. The manner of action is as follows:

On the assumption that the frequency $f_2$ in FIG. 8 is kept constant and is lower than the frequency $f_1$, which is to be assumed to depend on the relative air pressure $p/p_o$, the pulse frequency at the backward-counting input 36 of the VRZ 35 is equal to the pulse frequency $f_2$ at the forward-counting input 37, since the VV 31 and the VRZ 35 are connected as a feedback circuit. As a result, a BCD value which follows from formula (2) is automatically set up at the parallel control inputs:

$$M = \frac{f_a}{f_e} \cdot 10^{mges} = \frac{f_2}{f_1} \cdot 10^{mges} \qquad (3)$$

In this formula, $f_1$ is in the denominator. Since $f_2$ is constant, M is a hyperbolic function of $f_2$. The essential point here is that this function is continuously formed in electronic-digital fashion (as opposed to customary quotient-formers, which only deliver a new result each time after definite periods).

The curve in FIG. 7 may be approximately expressed by the following mathematical relationship:

$$H \approx \frac{n}{p/p_o + a} - b \qquad (4)$$

In order to realize this relationship electronically, the input and output quantities of the circuit according to FIG. 8 must be so affected as to result in the following, proceeding from formula (3):

$$M = 10^{\mu\mu es} \left[ \frac{f_2}{f_1 + a} \right] - b \qquad (5)$$

Figure 10:
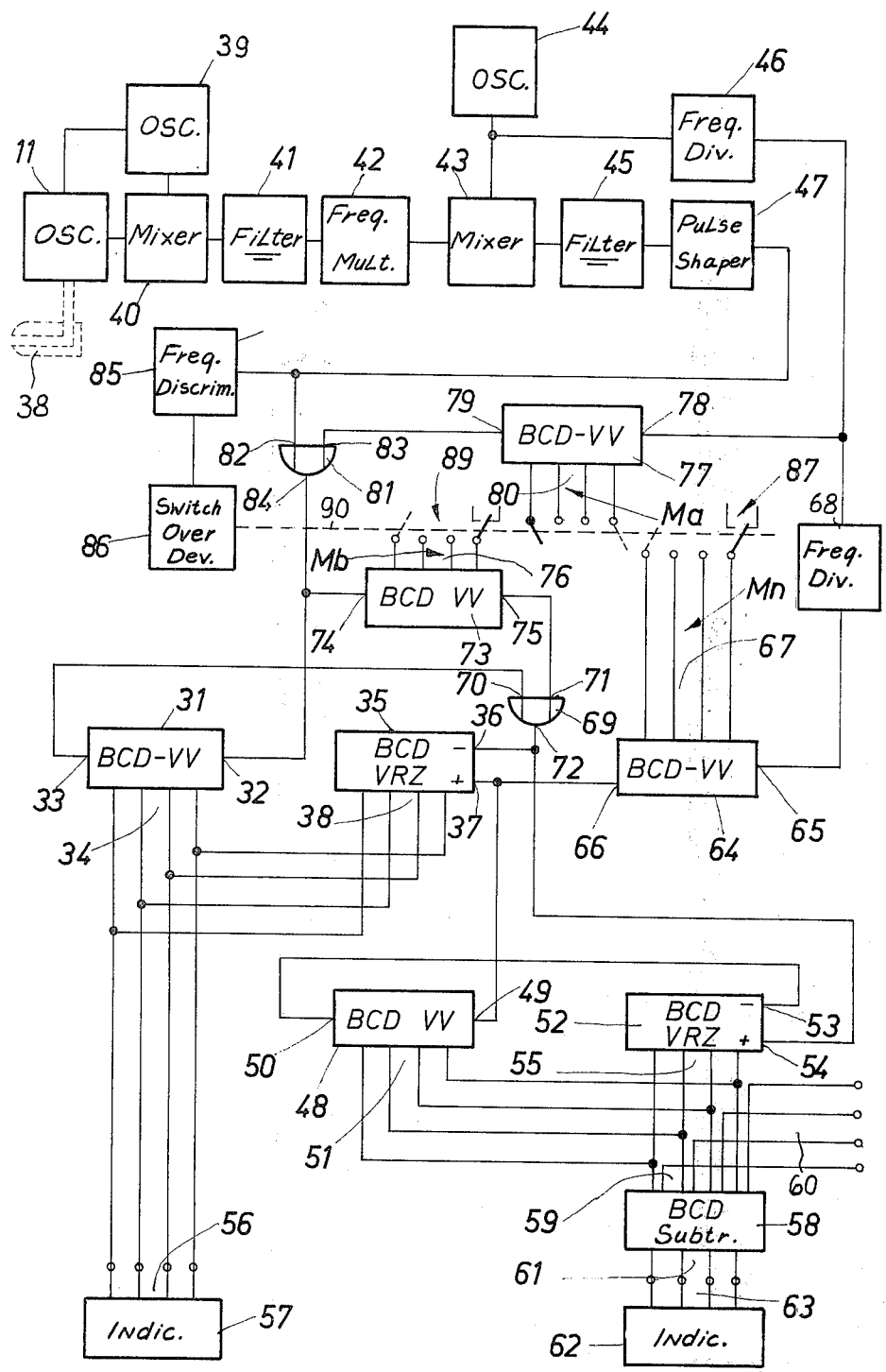
FIG. 10 is a block circuit diagram including the electrical portion of the arrangement according to the invention.

The realization of formula (6) is explained in conjunction with FIG. 10.

A comparison of (4) and (5) then gives:

$$u \stackrel{\Delta}{=} f_2 \qquad a \stackrel{\Delta}{=} a$$
$$p/p_o \stackrel{\Delta}{=} f_1 \qquad b \stackrel{\Delta}{=} b$$

Regard being had to the circuit according to FIG. 8, this means: The frequency $f_1$ must still be increased by a constant factor $a$. A constant value $b$ must still be subtracted from the output value M. Choice of the constant frequency $f_2$ can so affect the curvature, and choice of the constants $a$ and $b$ can so affect the displacement, of the hyperbola in the co-ordinate system, that the curve according to FIG. 7 is approximated to as far as is possible with the function according to formula (5).

However, it is technically complex to subtract the amount $b$ from the output value M. It becomes technically simpler to work out the value M if formula (5 is re-written as follows:

$$M = 10^{\mu\mu es} \frac{f_2 - b(f_1 + a)}{(f_1 + a)} \qquad (6)$$

However, it is not possible to approximate exactly to the function according to FIG. 7 with the circuit according to FIG. 8. A better approximation may be achieved if the curve according to FIG. 7 is made up of two parts, each corresponding to the above formula, but with other parameters. This possible method of approximation is illustrated in FIG. 9.

Figure 9:
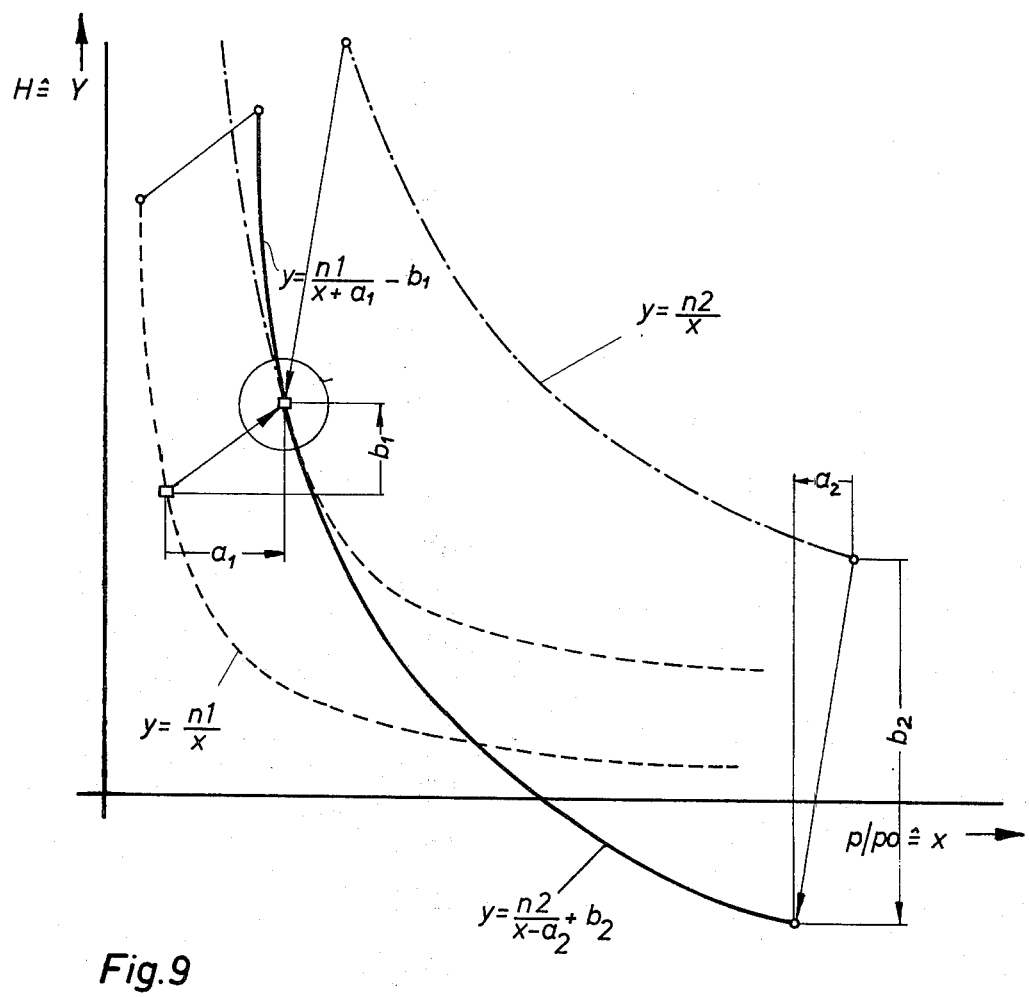
FIG. 9 is a graphical illustration for the purpose of explaining the approximation to the function shown in FIG. 7 by two parts of a hyperbola.

The function by which altitude depends on relative air pressure is illustrated in FIG. 9 as a thick full line. This line is to be made up of an upper part of a hyperbola with the function $$y = \frac{n_1}{x} \qquad (7)$$

and the lower part of a hyperbola with the function $$Y = \frac{n_2}{x} \qquad (8)$$

In order to make up this hyperbola in corresponding fashion, so that the parts meet at an intersection point and merge into one another, the upper part mentioned of the hyperbola with the function (7) must be displaced in the $x$ direction (corresponds to the relative pressure $p/p_0$) by the fixed value $a_1$, and in the $y$ direction (corresponds to altitude H) by the fixed value $b_1$.

The lower part of the hyperbola with the function (8) must be displaced in the $x$ direction by the fixed value $a_2$, and in the $y$ direction by the fixed value $b_2$. As a result, the upper part has the function $$y = \frac{n_1}{x + a_1} - b_1 \qquad (9)$$

and the lower part has the function $$y = \frac{n_2}{x - a_2} + b_2. \qquad (10)$$

The two parts of a hyperbola may be approximated to each case by correspondingly changing the modification of the input quantities of the circuit illustrated in FIG. 8.

How this takes place will be explained hereinafter with reference to the overall block circuit diagram illustrated in FIG. 10.

In FIG. 10, a ram pipe 38, illustrated in dashed line, is furthermore linked to the tuning fork oscillator 11. This is intended to indicate that the arrangement may be designed (alternatively) either to measure the altitude or to measure the horizontal speed of an aircraft. If the horizontal speed is to be measured, the pressure of the air surrounding the tuning fork is made dependent on the ram pressure of the ram pipe 38. In this case, the frequency of the tuning fork oscillator 11 also depends on the ram pressure.

The output signal of the tuning fork oscillator 11 is fed via the lead 9 to a mixer 40. The temperature-dependent signal of the temperature-dependent component 8 is fed via the lead 10 to an auxiliary oscillator 39. The frequency of the output signal of the auxiliary oscillator 39 depends on the temperature of the tuning fork. The output signal of the auxiliary oscillator 39 is likewise fed to the mixer 40. The mixer 40 is followed by a filter 41, which filters out the sum or difference frequency. The temperature characteristic of the temperature-dependent component 8 and the control characteristic of the auxiliary oscillator 39 are so chosen that compensation is provided for the effect of temperature on the tuning fork, and the sum or difference frequency filtered out by the filter 41 is constant and independent of temperature. The output signal of the filter 41 is fed to a frequency-multiplier 42. The output signal of the filter 41 is fed to a further mixer 43. The mixer 43 is also fed with the output signal of a fixed-frequency oscillator 44. The mixer 43 is followed by a filter 45, which filters out the sum of difference frequency of the product of mixing. The output signal of the filter 45 is fed to a pulse-shaper 47, which forms pulses from the oscillations.

The output of the pulse-shaper 47 is linked to one input 83 of an OR association member 81. The other input 83 of the OR association member 81 is linked to the pulse output 79 of a VV 77. The output 84 of the OR association member 84 is linked to the pulse input of a VV 31. The pulse output 33 of the VV 31 is linked to one input 70 of an OR association member 69. The other input 71 of the OR association member 69 is linked to the pulse output 75 of a VV 73.

The output of the OR association member 69 is linked to the backward-counting input 36 of a VRZ 35.

The forward-counting input 37 of the VRZ 35 is linked to the pulse output 66 of a VV 64. The parallel outputs 38 of the VRZ 35 are linked to the corresponding parallel inputs 56 of a digit-indicating device 57 for the altitude.

The pulse input 65 of the VV 64 is linked to the output of a frequency-divider 68. The input of the frequency 68 is linked to the linked to the output of another frequency divider 46. The input of the frequency 46 is linked to the output of the fixed-frequency oscillator 44.

The output of the frequency-divider 46 is also linked to the pulse input 78 of the VV 77. The pulse input of the VV 73 is linked to the output 84 of the OR association member 81.

The pulse input 49 of a VV 48 is furthermore linked to the pulse output 66 of the VV 64. The pulse output 50 of the VV 48 is linked to the backward-counting input 53 of a VRZ 52. The forward-counting input 54 of the VRZ 52 is linked to the output 72 of the OR association member 69. The parallel ouputs 55 of the VRZ are linked to the corresponding parallel control inputs 51 of the VV 48. The parallel outputs 55 of the VRZ 52 are also linked to the corresponding parallel inputs 59 of a subtraction unit 58 working in binary fashion. The subtraction inputs 60 of the subtraction unit 58 are fed with a constant binary value in parallel form.

The parallel outputs 61 of the subtraction unit 58 are linked to the corresponding parallel outputs 63 of a digit-indicating device 62 for vertical speed.

The parallel control inputs 67 of the VV 64 are linked to a change-over switch 87. The parallel control inputs 80 of the VV 77 are linked to a change-over switch 88. The parallel control inputs 76 of the VV 73 are linked to a change-over switch 89.

It will next be explained how formula (6) is realized:

The frequency $f_1$ in formula (6) corresponds to the frequency of the pulses at the output of the pulse-shaper 47. This frequency depends on the frequency of the tuning fork oscillator and thus on the air pressure. According to formula (6), a constant amount $a$ is added to the frequency $f_1$. This takes place in the OR association member 81. This member is supplied with output pulses from the VV 78 besides the output pulses of the pulse-shaper 47. It this connection, it must be borne in mind that the pulses are very narrow, and the probability of two pulses arriving one upon another is very slight. The frequency of the output pulses of the VV 78 depends on the frequency of its input pulses (this is the frequency of the fixed-frequency oscillator 44 divided down by the frequency-divider 76), and on the information $M_a$ set up at the parallel control inputs 80 in accordance with formula (2). The amount $a$ may also be selected with the information $M_a$. The change-over switch 80 is fed with two items of information $M_{a1}$ and $M_{a2}$ so that the amount $a$ may be switched over between $a_1$ and $a_2$ for the two parts of a hyperbola as shown in FIG. 9.

In formula (6), the value $(f_1 + a)$ must furthermore be multiplied by the factor $b$ and subtracted from the frequency $f_2$. Multiplication by $b$ takes place with the VV 73. According to formula (3), the value $b$ may be set up by the information $M_b$ at the parallel control inputs 76 of the VV 73. The change-over switch 89 is fed with two items of information $M_{b1}$ and $M_{b2}$, so that the amount $b$ can be switched over between $b_1$ and $b_2$ for the two parts of a hyperbola as shown in FIG. 9. Subtraction of $b(f_1 + a)$ in the counter of formula (6) is carried out by feeding the output pulse train of the VV 73 to the backward-counting input 36 of the VRZ 35. Since the backward-counting input 36 must also be fed with the output pulses of the VV 31 in accordance with the circuit in FIG. 8, logical association takes place via the OR association member 69.

The frequency $f_2$ in formula (6) is, as already explained in conjunction with FIG. 8, a fixed frequency fed to the forward-counting input. It also corresponds to the value $n$ in formula (4). The value $n$ is set up as information $M_n$ at the parallel control inputs of the VV 64 in accordance with formula (3). The pulse input 65 of the VV 64 is linked via the frequency-dividers 68 and 46 to the fixed-frequency oscillator 44. Accordingly, the frequency of the output pulses of the VV 64 according to formula (3) depends on the fixed frequency and on the information $M_n$. The change-over switch 87 is fed with two items of information $M_{n1}$ and $M_{n2}$, so that the amount $n$ corresponding to FIG. 9 may be switched over between $n_1$ and $n_2$ for the two parts of a hyperbola.

The change-over switches 87, 88 and 89 are, as indicated by the dashed line 90, synchronously coupled to one another and are simultaneously actuated by a switch-over device 86. The switch-over device 86 is controlled by a frequency-discriminator 85. The frequency-discriminator 85 has its switch-over point at a definite pulse frequency. This change-over pulse frequency corresponds to the intersection point of the two parts of a hyperbola in FIG. 9. In order words, this means that according to whether the pulse frequency corresponding to the air pressure at any particular time lies above or below the switch-over point of the frequency discriminator 85, the corresponding part of one or the other hyperbola is used for approximating to the function which the altitude depends on the relative air pressure.

The vertical speed is worked out on the basis of the fact that when there is a change in altitude the finite regulation speed of the feedback circuit between the backward-counting input 36 and the forward-counting input 37 formed from the VV 31 and the VRZ 35 results in a difference in the frequency of the pulses delivered there (due to the inertia of the regulator circuit or the finite regulation time). This difference increases with the vertical speed, i.e. the change in altitude per time-unit. If the vertical speed is zero, i.e. if the altitude is not changed, there is no difference in pulse frequency at the backward-counting input 36 and the forward-counting input 37 of the VRZ 35. According to formula (2), mentioned in conjunction with FIG. 8, the binary output value at the parallel outputs 55 of the VRZ 52 is then equal to $10^{m_{ges}}$, since the VV 48 and the VRZ 52 in turn constitute a frequency-ratio detector, as already explained in conjunction with FIG. 8. In order to obtain the correct value of vertical speed, the constant value $10^{m_{ges}}$ must be deducted from the binary output value of the VRZ 52. This deduction takes place in the subtraction unit 58. The constant value mentioned is introduced into the subtraction inputs 60 in parallel binary form.

What is claimed is:

1. An altimeter for measuring air pressure comprising an oscillator including a mechanical oscillating element surrounded by said air and whereof the frequency of oscillation is affected by the pressure of the air surrounding said oscillating element, a frequency-measuring means which measures the frequency of oscillation of the oscillator, and evaluating means which converts the measured frequency of oscillation into a value corresponding to the air pressure, said evaluating means comprising a distorting portion to which is fed an input signal whereof the frequency depends on the frequency of the oscillator, the distorting portion having a transmission characteristic curve approximating to a function by which altitude (H) depends on air pressure($p/p$), so that the output signal of the distorting portion is a direct measure of the altitude (H).

2. An altimeter according to claim 1, wherein the transmission characteristic curve of the distorting portion of the circuit is made up of at least two parts of a hyperbola merging into one another.

3. An altimeter according to claim 2, wherein the distorting portion comprises a first ratio-multiplier and a first forward-and-backward counter, the ratio-multiplier having a pulse input supplied with pulses whereof the frequency depends on the frequency of the oscillator, the first ratio-multiplier having a pulse output coupled to the backward-counting input of the first forward-and-backward counter, the forward-counting input of the first forward-and-backward counter being supplied with pulses at a constant frequency, the first forward-and-backward counter having parallel outputs linked to corresponding parallel control inputs of the first ratio-multiplier, the output signal, which is a direct measure of the altitude (H), being adapted for being taken off in the form of parallel items of binary information.

4. An altimeter according to claim 3, wherein the parallel outputs of the first forward-and-backward counter are linked to a digit-indicating means and/or to a data-processing means which evaluates the altitude information or passes it on via communication paths.

5. An altimeter according to claim 3, wherein the backward-counting input of the first forward-and-backward counter is linked to the forward-counting input of a second forward-and-backward counter, the backward-counting input of the second forward-and-backward counter being linked to the pulse output of a second ratio-multiplier, the pulse input of the second ratio-multiplier being linked to the forward-counting input of the second forward-and-backward counter, the parallel outputs of the second forward-and-backward counter being linked to the corresponding parallel control inputs of the second ratio-multiplier, the parallel outputs of the second forward-and-backward being linked to the corresponding parallel inputs of a subtraction means working in binary fashion, the parallel subtraction inputs of the subtraction means being supplied with constant binary information in parallel form, an output signal appearing on parallel outputs of the subtraction means which is a direct measure of vertical speed.

6. An altimeter according to claim 5, wherein the parallel outputs of the subtraction means are linked to a digit-indicating means and/or to a data-processing means which evaluates the vertical-speed information or passes it on via communication paths.

7. An altimeter according to claim 6, wherein the forward-counting input of the first forward-and-backward counter is linked to the pulse output of a third ratio-multiplier whereof the pulse input is supplied with pulses at a constant frequency, the parallel control inputs of the third ratio-multiplier being linked to a first change-over switch which is supplied with at least two different constant items of binary information ($M_{n1}, M_{n2}$) in parallel form which define the curvatures of the parts of a hyperbola which merge into one another, the output of a first OR association member being linked to the pulse input of the first ratio-multiplier, one input of the first OR association member being supplied with pulses whereof the frequency depends on the frequency of the first said oscillator, the other input of the first OR association member being linked to the pulse output of a fourth ratio-multiplier whereof the pulse input is supplied with pulses at a constant frequency, the parallel control inputs of the fourth ratio-multiplier being linked to a second change-over switch which is supplied with at least two different constant items of binary information ($M_{a1}, M_{a2}$) in parallel form which determine the displacement of one part of a hyperbola in the co-ordinate direction corresponding to the gas pressure with respect to the merging point of the two parts of a hyperbola, the pulse input of a fifth ratio-multiplier whereof the pulse output is linked to one input of a second OR association member being linked to the pulse input of the first ratio-multiplier, the second input of the OR association member being linked to the pulse output of the first ratio-multiplier, the output of the second OR association member being linked to the backward-counting input of the first forward-and-backward counter, the parallel control inputs of the fifth ratio-multiplier being linked to a third change-over switch which is supplied with at least two different constant items of binary information ($M_{b1}, M_{b2}$) in parallel form which determine the displacement of the other part of a hyperbola in the co-ordinate corresponding to altitude (H) with respect to the merging point of the two parts of a hyperbola, the first, second and third change-over switches being together linked to a change-over device, the change-over device being controlled by a frequency-discriminator, the frequency-discriminator being supplied with pulses whereof the frequency depends on the frequency of the first said oscillator, the turnover point of the discriminator lying at the frequency corresponding to the merging point of the parts of a hyperbola.

* * * * *